(12) United States Patent
Sakoske

(10) Patent No.: US 6,255,239 B1
(45) Date of Patent: Jul. 3, 2001

(54) LEAD-FREE ALKALI METAL-FREE GLASS COMPOSITIONS

(75) Inventor: George E. Sakoske, Washington, PA (US)

(73) Assignee: Cerdec Corporation, Washington, PA (US)

( * ) Notice: Subject to any disclaimer, the term of this patent is extended or adjusted under 35 U.S.C. 154(b) by 0 days.

(21) Appl. No.: 09/205,287

(22) Filed: Dec. 4, 1998

(51) Int. Cl.[7] .......................... C03C 3/064; C03C 3/066; C03C 3/068; C03C 8/06; C03C 8/16

(52) U.S. Cl. .......................... 501/77; 501/16; 501/17; 501/20; 501/25; 501/26; 501/32; 501/78; 501/79; 428/427; 428/428; 428/432

(58) Field of Search .................... 501/16, 17, 20, 501/21, 25, 26, 32, 73, 77, 78, 79; 428/427, 428, 432

(56) References Cited

U.S. PATENT DOCUMENTS

| | | | |
|---|---|---|---|
| 3,988,498 | | 10/1976 | Maher . |
| 5,252,521 | * | 10/1993 | Roberts .................................. 501/17 |
| 5,378,408 | * | 1/1995 | Carroll et al. ......................... 501/19 |
| 5,439,852 | * | 8/1995 | Hormadaly ............................. 501/26 |
| 5,491,118 | * | 2/1996 | Hormadaly ............................. 501/20 |
| 5,578,533 | * | 11/1996 | Manabe et al. ........................ 501/17 |
| 5,714,420 | * | 2/1998 | Sakoske et al. ....................... 501/14 |
| 5,753,571 | * | 5/1998 | Donohue ................................ 501/20 |

FOREIGN PATENT DOCUMENTS 9-268026 * 10/1997 (JP) .
9-278483 * 10/1997 (JP) .

OTHER PUBLICATIONS

Abstract for SU 923976, Apr. 1982.*

* cited by examiner

*Primary Examiner*—David R Sample
(74) *Attorney, Agent, or Firm*—Wenderoth, Lind & Ponack, LLP.

(57) ABSTRACT

Lead-free alkali metal-free bismuth-borosilicate glass compositions are disclosed. These compositions are useful in preparing glass frits which are employed in glass enamel compositions which, in turn, are used to prepare glass enamel pastes. The glass enamel pastes can be coated on non-porous substrates and fused to form decorative and functional coatings on the substrates.

22 Claims, No Drawings

LEAD-FREE ALKALI METAL-FREE GLASS COMPOSITIONS

This invention relates to lead-free alkali metal-free glass compositions, to glass enamel compositions and enamel paste compositions containing them as well as to glass and ceramic substrates coated with such enamel paste compositions.

BACKGROUND OF THE INVENTION

Low temperature melting lead-free glass compositions are known in the art. Such glasses are environmentally friendly and frits obtained from these glasses are useful in the preparation of glass enamel paste compositions which can be coated on glass or ceramic substrates and fused to provide decorative glazes and functional coatings on the substrates. Examples of such glass enamel paste compositions are those which are used as coatings for automotive and architectural glasses. The composition of these lead-free glass compositions is critical to the performance of the low melting glass frits prepared therefrom.

Reference can be made to the glass compositions disclosed in my copending U.S. patent application Ser. Nos. 09/066,533 and 09/066,534, both filed on Apr. 27, 1998 and Ser. No. 08/908,953, filed Aug. 8, 1997. Particular attention may also be directed to the following:

U.S. Pat. No. 4,554,258,

U.S. Pat. No. 4,892,847,

U.S. Pat. No. 5,252,521 and U.S. Pat. No. 5,326,591,

U.S. Pat. No. 4,970,178,

U.S. Pat. No. 5,308,803,

U.S. Pat. No. 5,629,247,

U.S. Pat. No. 5,093,285, No. 5,203,902 and European Patent Application No. 0 370 683

U.K. Patent Publication No. 2 301 100 A, and

U.S. Pat. No. 5,559,059 and No. 5,616,417.

Further illustrative of patent publications disclosing lead-free glass compositions are the following:

U.S. Pat. No. 4,446,241,

U.S. Pat. No. 4,537,862,

U.S. Pat. No. 4,224,074,

U.S. Pat. No. 4,312,951,

U.S. Pat. No. 4,376,169,

U.S. Pat. No. 5,504,045,

U.S. Pat. No. 5,578,533, and

International Application No. PCT/EP94/00403.

Finally, there may be mentioned the following patent publications:

U.S. Pat. No, 5,643,636,

U.S. Pat. No. 5,244,848,

U.S. Pat. No. 5,733,828, and

Japanese patent publication No. 9-268026.

All of the glass compositions disclosed by these patent publications and copending applications differ in certain critical respects from the novel compositions disclosed herein.

DISCLOSURE OF THE INVENTION

The present invention provides certain new and useful glass compositions which are lead-free and alkali metal-free and which provide beneficial characteristics which make them particularly useful in the formulation of glass enamel compositions and enamel paste compositions for application to glass and ceramic substrates such as automotive and architectural glasses. They also, however, will find use in developing glass markets such as the Plasma Display Panel (PDP) or other Flat Panel Display industries because of their electrical characteristics. There may be other electronic glass industries such as sealing and semi-conductor where these novel glasses will find use.

Thus, a principle field for the use of these glasses is expected to be in the PDP industry for use as the undercoating layers or barrier layers and for use in forming the rib structures of the display panels. See, for example, U.S. Pat. No. 5,674,634 which is incorporated herein by reference. The advantage of these glass chemistries are their low melting temperatures and thermal expansion/contraction coefficients specifically for sealing to glass substrates. Also particularly desirable should be the electrical properties of these glasses. The absence of alkali metal ions in the composition should provide for very low conductivities and very high breakdown voltages. Additionally, bismuth is known to have a very high electrical resistance and to have the highest Hall effect of any metal (see CRC Handbook of Chemistry and Physics, 57th Edition). All of these characteristics should result in extremely desirable electrical properties.

The glass compositions of the invention are believed to have excellent/superior electrical characteristics, chemical durability, broad temperature firing ranges, low stress and low expansion. For example, certain of the glasses have expansion properties in the range of $64$–$90 \times 10^7/°$ C.

The glass compositions of the invention are lead-free bismuth-borosilicate glass systems formulated without the use of alkali metal ions and possess the following compositional ranges:

| Oxide Component | Broad Range (wt %) | Preferred Range (wt %) | More Preferred Range (wt %) | Additional High Bi Range (wt %) |
|---|---|---|---|---|
| $Bi_2O_3$ | 50–90 | 67–84 | 68–84 | 78–88 |
| $SiO_2$ | 5–20 | 6–17 | 7–14 | 6.5–11 |
| $B_2O_3$ | 2–9 | 3–9 | 3.5–8.7 | 4–8.5 |
| $Al_2O_3$ | 0.1–10 | 1–9 | 1–8 | 0.1–7 |
| $TiO_2$ | 0–8 | 0–3 | 0–2 | 0–2 |
| ZnO | 0–9 | 0–8 | 0–6 | 0–6 |
| $ZrO_2$ | 0–10 | 0.1–7 | 0.5–3 | 0–3 |
| $F^{-1}$ | 0–4 | 0–3 | 0–2 | 0–2 |
| SrO | up to 10 | | | |
| CaO | up to 7 | | | |
| MgO | up to 7 | | | |
| CeO | up to 10 | | | |
| MnO | up to 10 | | | |
| SnO | up to 10 | | | |
| $P_2O_5$ | up to 7 | | | |
| $Sb_2O_3$ | up to 10 | | | |
| $Fe_2O_3$ | up to 10 | | | |
| $Nb_2O_5$ | up to 10 | | | |

It is worthy to note that the compositions contain 0.1 to 10 weight % $Al_2O_3$. It is believed that this is an advantage to the compositions in terms of reducing refractory corrosion during the melting process.

Also of specific note are compositions which contain fluorine in an amount of 0.2 to 4.0 weight % as these compositions are believed to have particularly desirable properties.

It is noted that certain prior art glass compositions contain rather large required content of BaO and SrO (see Japanese Patent Publication No. 9-268026). This results in glasses with very high expansions which would not be suitable for soda-lime glass substrates or similar expansion materials when the $B_2O_3$ content is within the range of the compositions of this invention. It is preferable that in the compositions of the present invention the SrO content not exceed 5 weight %.

The glass compositions of the invention possess excellent to outstanding thermal expansion properties for sealing to a glass substrate, an excellent to outstanding low temperature fusing or sealing range of about 535 to 600° C. so that no distortion of the glass substrate occurs, good chemical durability and, even more importantly, these alkali metal-free compositions are believed to have excellent to outstanding electrical properties.

The glass compositions are formed in a known manner as, for example, blending the known starting materials and melting at a temperature of about 1000° to 1300° C. for about forty (40) minutes to form a molten glass having the desired composition. The molten glass formed can then be suddenly cooled, e.g., water quenched, in a known manner to form a frit. The frit can then be ground using conventional milling techniques to a fine particle size, preferably between 2 to 6 microns. This component comprises the disclosed glass frit compositions.

The glass frit component can be a single composition of the invention or, alternatively, can be a mixture of these frits. Also, at least one frit of the present invention may be combined with an additional low melting frit having a composition outside the scope of those of the invention to the extent that this other frit does not deteriorate the qualities of the enamel which results.

The invention also provides glass (ceramic) enamel compositions employing the above-described glass frit compositions. These compositions comprise from about 30 to 95 wt. % solids of a glass frit component.

The finely ground glass frit can be combined with a mixed metal oxide pigment, any other type of metal powder, metal resonate, or other material of choice. Typical mixed metal oxide pigments used to produce black colors in the automotive industry would include oxides of copper, chrome, iron, cobalt, nickel, manganese, and the like. Although these black spinel pigments are preferred for use in the automotive industry, other metal oxide pigments to produce other various colors, may be combined with the glass frit compositions in this invention. Other end uses could include, and are not limited to, the architectural, appliance, and beverage industries. The pigment component would generally comprise from 5 to 40% by weight of the glass frit, depending upon the range of color, glass, and opacity desired.

Pigments for use are known in the art and are commercially available. Examples are those such as $CuCr_2O_4$, $(Co,Fe)(Fe,Cr)_2O_4$ and the like. Illustrative are pigments available from Cerdec Corporation as *2991 pigment which is a copper chromite black pigment, *2980 pigment which is a cobalt chromium iron black pigment and *2987 pigment which is a nickel manganese iron chromium black pigment.

The enamel compositions of the invention may also contain up to about 15 wt % solids of a commonly used filler such as silica and alumina, and other conventional additives, such as iron, silicon, zinc and the like to enhance desired properties, such as resistance to silver bleed-through. The filler may also be a refractory oxide filler such as wollastonite and materials such as alumina-silicate materials, calcium silicate compounds, boron alumina-silicate compounds, soda calcia-alumina-silicate compounds, feldspar compounds, titania and combinations of such oxides.

The enamel compositions may also contain up to about 20 wt % solids of a crystalline seed material such as bismuth silicate which is disclosed in my prior U.S. Pat. No. 5,714,420, which is incorporated herein by reference. The bismuth silicate seed materials include, but are not limited to, $Bi_{12}SiO_{20}$, $Bi_4(SiO_4)_3$ and $Bi_2SiO_5$. Use of the bismuth silicates mentioned, in combination with the frits disclosed herein could be used to form plasma display barrier ribs which would fuse, sinter and partially crystallize and maintain shape without deformation.

The enamel compositions are combined with an organic vehicle to form a printable enamel paste. The enamel paste in general will contain from about 85 to about 60 wt % solids as above described and above 15 to about 40 wt % of the suitable organic vehicle. The viscosity of the paste is adjusted so that it can be screen printed, roll coated or sprayed onto the desired substrate.

The vehicle to be employed in the paste is selected on the basis of its end use application. It is essential that the vehicle adequately suspend the particulates and burn off completely upon firing of the paste on the substrate. Vehicles are typically organic and include compositions based on pine oils, vegetable oils, mineral oils, low molecular weight petroleum fractions, tridecyl alcohols, synthetic and natural resins, and the like. Surfactants and/or other film forming modifiers can also be included.

Correspondingly, UV-base vehicles are equally applicable for use in the invention. Such UV-base vehicles are well known in the art and are generally composed of polymerizable monomers and/or oligomers containing, for example, acrylate or methacrylate functional groups, together with photoinitiators and polymerization inhibitors. Representative systems are disclosed in U.S. Pat. Nos. 4,306,012 and 4,649,062. As is recognized, such systems are cured with ultraviolet radiation after application to the substrate.

The specific vehicle and amounts employed are selected based upon the specific components of the paste and the desired viscosity. In general, the amount of the vehicle is about 15 to about 40% by weight based upon the total weight of the enamel paste.

In general, the enamel pastes are viscous in nature, with the viscosity depending upon the application method to be employed and end use. For purposes of screen-printing, viscosities ranging from 10,000 to 80,000 and preferably 35,000 to 65,000 centipoises at 20° C., as determined on a Brookfield Viscometer, #7 spindle at 20 rpm, are appropriate.

The invention also provides a substrate having fired thereon an enamel paste of the invention. Such substrates are illustrated by glass, ceramic or other non-porous substrates and particularly an automotive glass substrate. Other substrates include architectural glass, appliances and beverage containers. In particular, the substrates include Plasma Display Panels and other Flat Display Panels as previously discussed herein. In the latter respect, see U.S. Pat. No. 5,807,154, No. 5,085,334 and No. 5,136,207 which are incorporated herein by reference.

To prepare the enamel compositions of the invention, the necessary frit or frits are ground to a fine powder using conventional methods. The frit component is then combined with the other solids components. The solids are then mixed with the necessary vehicle to form the enamel paste. The viscosity is adjusted as desired.

Once the enamel paste is prepared, it can be applied to the substrate in a conventional manner such as by screen printing, decal application, spraying, brushing, roller coating or the like. Screen printing is preferred when the paste is applied to a glass substrate. After application of the paste to a substrate in a desired pattern, the applied coating is then fired to bond the enamel to the substrate. The firing temperature is generally determined by the frit maturing temperature, and preferably is in a broad temperature range. Typically, the firing range for an instant composition is in the range of about 500° to 750° C., more preferably in the range of about 520° to 650° C. and most preferably about 530 to 620° C.

EXAMPLES

Low melting glass frit compositions are produced by mixing together raw materials which are known to the art, and using methods known to those skilled in the art. The well mixed raw batch compositions are then melted at temperatures between 1000 to 13000° C., followed by sudden cooling, again using methods known to those skilled in the art. The glass compositions are then ground to a fine particle size, preferably between 2 to 6 microns using a ball mill. The finely ground powder frits are then used to form glass enamel compositions.

When colored enamel compositions are desired, the finely ground glass frit is combined with a mixed metal oxide pigment.

Further, the solids of the enamel compositions are dispersed and suspended in a vehicle selected for the end use application to form the enamel paste.

Testing is performed by combining the glass frit or enamel composition with a pine oil based vehicle and screen printing the resulting frit or enamel paste on to a microscope slide or automotive glass substrate. The slides or automotive glass substrate are then fired at various temperatures to determine the "firing temperature", FT, or "minimum firing temperature" MF. The FT is the temperature where the glass has sufficient time to flow and fuse within a 15 minute fire and yield a glossy smooth surface. The MF is the temperature where the enamel has sufficient time to flow and fuse in a 4 minute fire and yield an enamel without interconnected porosity. Preheat time is 10 and 6 minutes at 427° for FT and MF respectively.

Acid resistance is evaluated using ASTM C-724-91 using a 10% by weight solution of citric acid. Fired trials are exposed to the solution for 15 minutes and rated based upon the following:

Grade 1—No apparent attack
Grade 2—Appearance of iridescence or visible stain on the exposed surface when viewed at an angle of 45°, but not apparent when viewed at angles less than 30°.
Grade 3—A definite stain which does not blur reflected images and is visible at angles less than 30°.
Grade 4—Definite stain with a gross color change or strongly iridescent surface visible at angles less than 30° and which may blur reflected images.
Grade 5—Surface dull or matte with chalking possible.
Grade 6—Significant removal of enamel with pinholing evident.
Grade 7—Complete removal of enamel in exposed area.

Thermal Expansion Coefficient ($\alpha_{25-325°\ C.}$) is measured from 25 to 325° C. using a dilatometer.

Glass Frit Formulation (weight %)

| Component | Example 1 | Example 2 | Example 3 | Example 4 | Example 5 |
|---|---|---|---|---|---|
| $Bi_2O_3$ | 72.5 | 66.0 | 69.5 | 71.2 | 73.0 |
| $SiO_2$ | 13.0 | 15.0 | 11.0 | 15.0 | 11.0 |
| $B_2O_3$ | 3.5 | 5.7 | 8.0 | 5.7 | 8.0 |
| $Al_2O_3$ | 3.0 | 5.2 | 8.0 | 8.0 | 8.0 |
| ZnO | 8.0 | 8.0 | 3.5 | 0 | 0 |
| Fire Temp. (° C.) | 550 | 575 | 565 | 600 | 570 |
| Acid Resistance ASTM C-724-91 | 1 | 2 | 3 | 1 | 2 |
| $\alpha_{25-325°\ C.} \times 10^{-7}/°$ C. | 75 | 68 | 73 | 68 | 72 |

| | 6 | 7 | 8 | 9 | 10 |
|---|---|---|---|---|---|
| $Bi_2O_3$ | 78.9 | 84.6 | 76.7 | 86.4 | 67.7 |
| $SiO_2$ | 11.3 | 5.9 | 12.0 | 6.7 | 11.0 |
| $B_2O_3$ | 3.6 | 4.4 | 5.2 | 4.2 | 5.2 |
| $Al_2O_3$ | 6.2 | 4.4 | 6.1 | 0 | 8.0 |
| ZnO | 0 | 0.6 | 0 | 2.7 | 8.0 |
| Fire Temp. (° C.) | 545 | 530 | 565 | 525 | 565 |
| Acid Resistance ASTM C-724-91 | 2 | 3 | 3 | — | 3 |
| $\alpha_{25-325°\ C.} \times 10^{-7}/°$ C. | 83 | 89 | 80 | 73 | 74 |

| | 11 | 12 | 13 | 14 |
|---|---|---|---|---|
| $Bi_2O_3$ | 79.3 | 78.1 | 76.8 | 75.3 |
| $SiO_2$ | 9.0 | 8.8 | 9.7 | 9.6 |
| $B_2O_3$ | 8.5 | 8.3 | 7.9 | 7.8 |
| $Al_2O_3$ | 2.0 | 1.5 | 2.3 | 3.1 |
| $ZrO_2$ | 0.7 | 0.7 | 0.7 | 0.7 |
| ZnO | 0 | 0 | 0.3 | 0.3 |
| $TiO_2$ | 0 | 0 | 0.4 | 0.4 |
| CaO | 0 | 2.1 | 0 | 0 |
| MgO | 0 | 0 | 0.2 | 0.2 |
| SrO | 0 | 0 | 0.6 | 0.5 |
| F-1 | 0.5 | 0.5 | 1.1 | 2.1 |
| Fire Temp. (° C.) | 525 | 535 | 535 | 555 |
| Acid Resistance ASTM C-7624-91 | 2 | 2 | 1 | 1 |
| $\alpha_{25-325°\ C.} \times 10^{-7}/°$ C. | 84 | 85 | 83 | 78 |

Having described the invention, what is claimed is:

1. A lead-free alkali metal-free bismuth-borosilicate glass composition consisting essentially of

| Component | Weight Percent |
|---|---|
| $Bi_2O_3$ | 50–90 |
| $SiO_2$ | 5–20 |
| $B_2O_3$ | 2–9 |
| $Al_2O_3$ | 0.1–10 |
| $TiO_2$ | 0–8 |
| ZnO | 0–9 |
| $ZrO_2$ | 0–10 |
| $F^{-1}$ | 0.2–4.0 |
| SrO | less than 4 |
| CaO | up to 7 |
| MgO | up to 7 |
| CeO | up to 10 |
| MnO | up to 10 |
| SnO | up to 10 |
| $P_2O_5$ | up to 7 |
| $Sb_2O_3$ | up to 10 |
| $Fe_2O_3$ | up to 10 |
| $Nb_2O_5$ | up to 10. |

2. A glass composition according to claim 1, consisting essentially of

| Component | Weight Percent |
|---|---|
| $Bi_2O_3$ | 67–84 |
| $SiO_2$ | 6–17 |
| $B_2O_3$ | 3–9 |
| $Al_2O_3$ | 1–9 |
| $TiO_2$ | 0–3 |
| $ZnO$ | 0–8 |
| $ZrO_2$ | 0.1–7 |
| $F^{-1}$ | 0.2–3 |

3. A glass composition according to claim 1, consisting essentially of

| Component | Weight Percent |
|---|---|
| $Bi_2O_3$ | 67–84 |
| $SiO_2$ | 7–14 |
| $B_2O_3$ | 3.5–8.7 |
| $Al_2O_3$ | 1–8 |
| $TiO_2$ | 0–2 |
| $ZnO$ | 0–6 |
| $ZrO_2$ | 0.5–3 |
| $F^{-1}$ | 0.2–2 |

4. A glass composition according to claim 1, consisting essentially of

| Component | Weight Percent |
|---|---|
| $Bi_2O_3$ | 78–88 |
| $SiO_2$ | 6.5–11 |
| $B_2O_3$ | 4–8.5 |
| $Al_2O_3$ | 0.1–7 |
| $TiO_2$ | 0–2 |
| $ZnO$ | 0–6 |
| $ZrO_2$ | 0–3 |
| $F^{-1}$ | 0.2–2 |

5. A glass composition according to claim 1, wherein the fluorine content is 0.5 to 2.1 weight percent.

6. A glass frit produced from a lead-free alkali metal-free bismuth-borosilicate glass composition consisting essentially of:

| Component | Weight Percent |
|---|---|
| $Bi_2O_3$ | 50–90 |
| $SiO_2$ | 5–20 |
| $B_2O_3$ | 2–9 |
| $Al_2O_3$ | 0.1–10 |
| $TiO_2$ | 0–8 |
| $ZnO$ | 0–9 |
| $ZrO_2$ | 0–10 |
| $F^{-1}$ | 0.2–4.0 |
| SrO | less than 4 |
| CaO | up to 7 |
| MgO | up to 7 |
| CeO | up to 10 |
| MnO | up to 10 |
| SnO | up to 10 |
| $P_2O_5$ | up to 7 |

-continued

| Component | Weight Percent |
|---|---|
| $Sb_2O_3$ | up to 10 |
| $Fe_2O_3$ | up to 10 |
| $Nb_2O_5$ | up to 10 |

7. A glass frit as defined in claim 6, wherein the glass composition consists essentially of:

| Component | Weight Percent |
|---|---|
| $Bi_2O_3$ | 67–84 |
| $SiO_2$ | 6–17 |
| $B_2O_3$ | 3–9 |
| $Al_2O_3$ | 1–9 |
| $TiO_2$ | 0–3 |
| $ZnO$ | 0–8 |
| $ZrO_2$ | 0.1–7 |
| $F^{-1}$ | 0.2–3 |

8. A glass frit according to claim 6, wherein the glass composition consists essentially of:

| Component | Weight Percent |
|---|---|
| $Bi_2O_3$ | 68–84 |
| $SiO_2$ | 7–14 |
| $B_2O_3$ | 3.5–8.7 |
| $Al_2O_3$ | 1–8 |
| $TiO_2$ | 0–2 |
| $ZnO$ | 0–6 |
| $ZrO_2$ | 0.5–3 |
| $F^{-1}$ | 0.2–2 |

9. A glass frit according to claim 6, wherein the glass composition consists essentially of:

| Component | Weight Percent |
|---|---|
| $Bi_2O_3$ | 78–88 |
| $SiO_2$ | 6.5–11 |
| $B_2O_3$ | 4–8.5 |
| $Al_2O_3$ | 0.1–7 |
| $TiO_2$ | 0–2 |
| $ZnO$ | 0–6 |
| $ZrO_2$ | 0–3 |
| $F^{-1}$ | 0.2–2 |

10. A glass frit according to claim 6, wherein the amount of fluorine is 0.5 to 2.1 weight percent.

11. In a glass enamel paste which comprises a glass frit component, an oxide pigment component and an organic vehicle, the improvement wherein the glass frit component comprises at least one glass frit produced from a lead-free alkali metal-free bismuth-borosilicate glass composition consisting essentially of:

| Component | Weight Percent |
|---|---|
| $Bi_2O_3$ | 50–90 |
| $SiO_2$ | 5–20 |
| $B_2O_3$ | 2–9 |

-continued

| Component | Weight Percent |
| --- | --- |
| $Al_2O_3$ | 0.1–10 |
| $TiO_2$ | 0–8 |
| ZnO | 0–9 |
| $ZrO_2$ | 0–10 |
| $F^{-1}$ | 0.2–4.0 |
| SrO | less than 4 |
| CaO | up to 7 |
| MgO | up to 7 |
| CeO | up to 10 |
| MnO | up to 10 |
| SnO | up to 10 |
| $P_2O_5$ | up to 7 |
| $Sb_2O_3$ | up to 10 |
| $Fe_2O_3$ | up to 10 |
| $Nb_2O_5$ | up to 10 |

12. A glass enamel paste according to claim 11, wherein the glass composition consists essentially of:

| Component | Weight Percent |
| --- | --- |
| $Bi_2O_3$ | 67–84 |
| $SiO_2$ | 6–17 |
| $B_2O_3$ | 3–9 |
| $Al_2O_3$ | 1–9 |
| $TiO_2$ | 0–3 |
| ZnO | 0–8 |
| $ZrO_2$ | 0.1–7 |
| $F^{-1}$ | 0.2–3 |

13. A glass enamel paste according to claim 11, wherein the glass composition consists essentially of:

| Component | Weight Percent |
| --- | --- |
| $Bi_2O_3$ | 68–84 |
| $SiO_2$ | 7–14 |
| $B_2O_3$ | 3.5–8.7 |
| $Al_2O_3$ | 1–8 |
| $TiO_2$ | 0–2 |
| ZnO | 0–6 |
| $ZrO_2$ | 0.5–3 |
| $F^{-1}$ | 0.2–2 |

14. A glass enamel paste according to claim 11, wherein the glass composition consists essentially of:

| Component | Weight Percent |
| --- | --- |
| $Bi_2O_3$ | 78–88 |
| $SiO_2$ | 6.5–11 |
| $B_2O_3$ | 4–8.5 |
| $Al_2O_3$ | 0.1–7 |
| $TiO_2$ | 0–2 |
| ZnO | 0–6 |
| $ZrO_2$ | 0–3 |
| $F^{-1}$ | 0.2–2 |

15. A glass enamel paste according to claim 11, wherein the fluorine content is 0.5 to 2.1 weight percent.

16. A glass enamel paste according to claim 11, wherein the solids content is about 85 to about 60 weight percent.

17. A glass enamel paste according to claim 11, wherein the glass frit component contains at least one other low temperature melting glass frit.

18. A glass enamel paste according to claim 11, which also contains up to 20 weight percent solids of a crystalline seed material.

19. A glass enamel paste according to claim 18, wherein the crystalline seed material is bismuth silicate.

20. A non-porous substrate having fired thereon a glass enamel paste as defined in claim 11.

21. A substrate according to claim 20, which is automotive glass.

22. A substrate according to claim 20, which is a plasma display panel or other flat display panel.

\* \* \* \* \*